United States Patent
Chen

(10) Patent No.: US 11,353,683 B2
(45) Date of Patent: Jun. 7, 2022

(54) CAMERA OPTICAL LENS

(71) Applicant: AAC Optics Solutions Pte. Ltd., Singapore (SG)

(72) Inventor: Jiekang Chen, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 272 days.

(21) Appl. No.: 16/857,192

(22) Filed: Apr. 24, 2020

(65) Prior Publication Data
US 2021/0263269 A1  Aug. 26, 2021

(30) Foreign Application Priority Data
Feb. 24, 2020 (CN) .......................... 202010111413.2

(51) Int. Cl.
 *G02B 13/00* (2006.01)
 *G02B 9/34* (2006.01)
(52) U.S. Cl.
 CPC ............. *G02B 13/004* (2013.01); *G02B 9/34* (2013.01)
(58) Field of Classification Search
 CPC ........ G02B 13/004; G02B 9/34; G02B 13/06; G02B 15/144; G02B 15/144105; G02B 9/60; G02B 15/145; G02B 15/1451; G02B 15/145111; G02B 15/14511; G02B 9/62; G02B 9/64; G02B 13/0045
 USPC ......................................... 359/715, 713, 714
 See application file for complete search history.

(56) References Cited

U.S. PATENT DOCUMENTS

| | | | |
|---|---|---|---|
| 2008/0043343 A1* | 2/2008 | Chen | G02B 13/004 359/689 |
| 2009/0207506 A1* | 8/2009 | Tang | G02B 13/18 359/773 |
| 2012/0327521 A1* | 12/2012 | Tsai | G02B 13/004 359/715 |
| 2016/0154207 A1* | 6/2016 | Son | G02B 13/004 359/715 |
| 2016/0259145 A1* | 9/2016 | Liu | G02B 13/004 |
| 2019/0391366 A1* | 12/2019 | Yamazaki | G02B 13/0045 |
| 2020/0209570 A1* | 7/2020 | Yamazaki | G02B 13/0045 |
| 2020/0393649 A1* | 12/2020 | Shin | G02B 13/0045 |
| 2021/0208366 A1* | 7/2021 | Wu | G02B 13/004 |

* cited by examiner

*Primary Examiner* — Marin Pichler
*Assistant Examiner* — Alberto J Betancourt
(74) *Attorney, Agent, or Firm* — W&G Law Group

(57) ABSTRACT

The present invention relates to the technical field of optical lens and discloses a camera optical lens. The camera optical lens includes, from an object side to an image side: a first lens having a positive refractive power, a second lens having a negative refractive power, a third lens having a positive refractive power, and a fourth lens having a negative refractive power. The camera optical lens satisfies following conditions: $-3.50 \leq f2/f \leq -1.50$; $3.00 \leq (R3+R4)/(R3-R4) \leq 8.00$; $8.00 \leq d1/d2 \leq 15.00$; $0.50 \leq f3/f \leq 0.75$; $-5.00 \leq R2/R1 \leq -2.50$; $-0.70 \leq f4/f \leq -0.40$. The camera optical lens can achieve excellent optical characteristics with a large aperture, wide-angle, and being ultra-thin.

10 Claims, 6 Drawing Sheets

CAMERA OPTICAL LENS

TECHNICAL FIELD

The present invention relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece lens structure. However, with the development of technology and the increase of the diverse demands of users, and as the pixel area of photosensitive devices is becoming smaller and smaller and the requirement of the system on the imaging quality is improving constantly, the four-piece lens structure gradually appear in lens designs. Although normal four-piece lens structure already has good optical characteristics, lens distance and lens shape thereof are still improper, which make the seven-piece lens structure unable of satisfying the design requirement of large aperture, and being ultra-thin.

DETAILED DESCRIPTION OF EMBODIMENTS

To make the objects, technical solutions, and advantages of the present invention clearer, embodiments of the present invention are described in detail with reference to accompanying drawings in the following. A person of ordinary skill in the art can understand that, in the embodiments of the present invention, many technical details are provided to make readers better understand the present invention. However, even without these technical details and any changes and modifications based on the following embodiments, technical solutions required to be protected by the present invention can be implemented.

Embodiment 1

Figure 1:
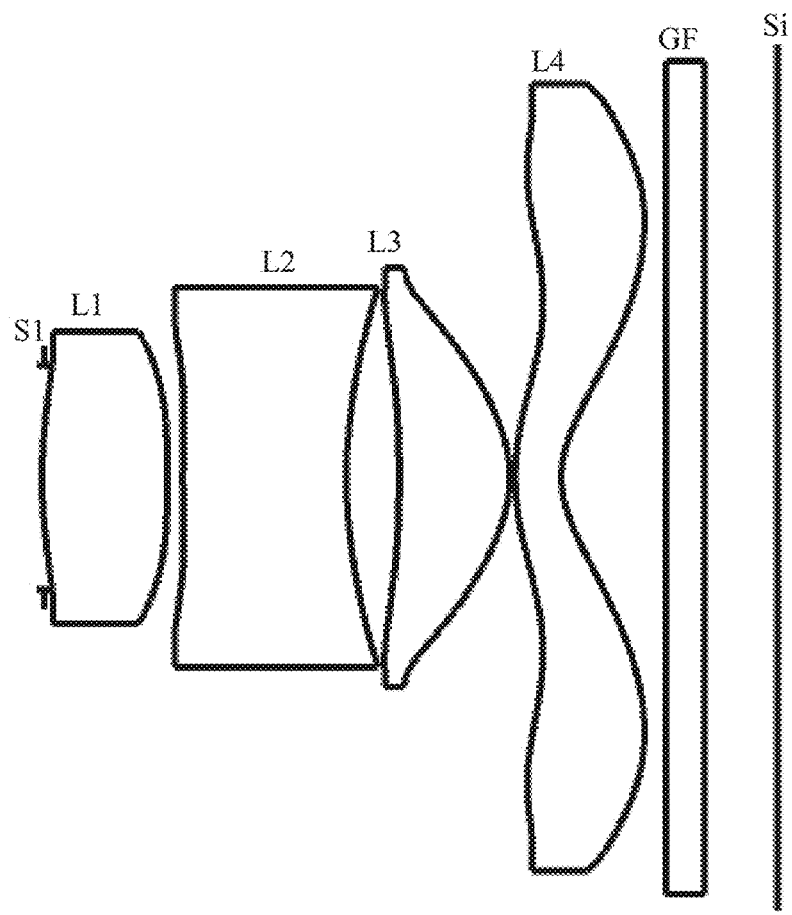
FIG. 1 is a schematic diagram of a structure of a camera optical lens according to Embodiment 1 of the present invention.

Referring to the accompanying drawings, the present invention provides a camera optical lens 10. FIG. 1 shows the camera optical lens 10 of Embodiment 1 of the present invention, the camera optical lens 10 includes four lenses. Specifically, the camera optical lens 10 includes, from an object side to an image side: an aperture S1, a first lens L1, a second lens L2, a third lens L3, and a fourth lens L4. In an embodiment, preferably, an optical element such as an optical filter GF can be arranged between the fourth lens L4 and an image surface Si.

In an embodiment, the first lens L1 has a positive refractive power, the second lens L2 has a negative refractive power, the third lens L3 has a positive refractive power, and the fourth lens L4 has a negative refractive power.

In an embodiment, a focal length of the camera optical lens is defined as f, a focal length of the second lens is defined as f2, a focal length of the third lens is defined as f3, a focal length of the fourth lens is defined as f4, a curvature radius of the object-side surface of the first lens is defined as R1, a curvature radius of the image-side surface of the first lens is defined as R2, a curvature radius of the object-side surface of the second lens is defined as R3, a curvature radius of the image-side surface of the second lens is defined as R4, an on-axis thickness of the first lens is defined as d1, an on-axis distance from the image-side surface of the first lens to the object-side surface of the second lens is defined as d2, and the camera optical lens 10 should satisfy following conditions:

$$-3.50 \leq f2/f \leq -1.50 \quad (1)$$

$$3.00 \leq (R3+R4)/(R3-R4) \leq 8.00 \quad (2)$$

$$8.00 \leq d1/d2 \leq 15.00 \quad (3)$$

$$0.50 \leq f3/f \leq 0.75 \quad (4)$$

$$-5.00 \leq R2/R1 \leq -2.50 \quad (5)$$

$$-0.70 \leq f4/f \leq -0.40 \quad (6)$$

Formula (1) specifies a ratio of the focal length of the second lens and the focal length of the camera optical lens, thereby effectively balancing a spherical aberration and a field curvature of the system.

Formula (2) specifies a shape of the second lens. Within this range, it can decrease deflection of light which passing through the lens, and effectively reduces aberration.

Formula (3) specifies a ratio of the on-axis thickness of the first lens and the on-axis distance from the image-side surface of the first lens to the object-side surface of the second lens, Within this range, it can decrease a total optical length (TTL) of the camera optical lens, and realize ultra-thin effect. Preferably, the camera optical lens 10 further satisfies a condition of $8.03 \leq d1/d2 \leq 14.75$.

Formula (4) specifies a ratio of the focal length of the third lens and the focal length of the camera optical lens. An appropriate distribution of the refractive power leads to a better imaging quality and a lower sensitivity.

Formula (5) specifies a shape of the first lens. Within this range, it can decrease deflection of light which passing through the lens, and effectively reduces aberration.

Formula (6) specifies a ratio of the focal length of the fourth lens and the focal length of the camera optical lens. An appropriate distribution of the refractive power leads to a better imaging quality and a lower sensitivity.

A curvature radius of the object-side surface of the fourth lens is defined as R7; a curvature radius of the image-side surface of the fourth lens is defined as R8, and the camera optical lens 10 further satisfies a condition of $2.50 \le R7/R8 \le 5.00$. Within this range, a development towards ultra-thin and wide-angle lens would easily correcting a problem like an off-axis aberration.

In an embodiment, the object-side surface of the first lens L1 is convex in a paraxial region, the image-side surface of the first lens L1 is convex in the paraxial region.

A focal length of the camera optical lens is defined as f, a focal length of the first lens L1 is defined as f1, and the camera optical lens 10 should satisfy a condition of $0.40 \le f1/f \le 2.53$, which specifies a ratio of the focal length of the first lens L1 and the focal length of the camera optical lens. Within this range, the first lens L1 has a proper positive refractive power, thereby facilitating reducing aberration and helpful for a development towards ultra-thin and large aperture. Preferably, the camera optical lens 10 further satisfies a condition of $0.65 \le f1/f \le 2.03$.

A curvature radius of an object-side surface of the first lens L1 is defined as R1, a curvature radius of an image-side surface of the first lens L1 is defined as R2, and the camera optical lens 10 further satisfies a condition of $-1.33 \le (R1+R2)/(R1-R2) \le -0.29$. This can reasonably control a shape of the first lens L1 in such a manner that the first lens L1 can effectively correct a spherical aberration of the camera optical lens. Preferably, the camera optical lens 10 further satisfies a condition of $-0.83 \le (R1+R2)/(R1-R2) \le -0.36$.

An on-axis thickness of the first lens L1 is defined as d1, a total optical length from the object side surface of the first lens L1 to the image surface Si of the camera optical lens along an optical axis is defined as TTL, and the camera optical lens 10 further satisfies a condition of $0.06 \le d1/TTL \le 0.29$. Within this range, it can facilitate achieving ultra-thin lenses. Preferably, the camera optical lens 10 further satisfies a condition of $0.09 \le d1/TTL \le 0.24$.

In an embodiment, an object-side surface of the second lens L2 is convex in the proximal region, and an image-side surface of the second lens L2 is concave in the proximal region.

An on-axis thickness of the second lens L2 is defines as d3, and the camera optical lens 10 further satisfies a condition of $0.02 \le d3/TTL \le 0.33$. This can facilitate achieving ultra-thin lenses. Preferably, the camera optical lens 10 further satisfies a condition of $0.02 \le d3/TTL \le 0.27$.

In an embodiment, an object-side surface of the third lens L3 is concave in the proximal region, and an image-side surface of the third lens L3 is convex in the proximal region.

A curvature radius of the object-side surface of the third lens L3 is defined as R5, a curvature radius of the image-side surface of the third lens L3 is defined as R6, and the camera optical lens 10 further satisfies a condition of $0.39 \le (R5+R6)/(R5-R6) \le 2.45$. This specifies a shape of the third lens L3. Within this range, it can decrease deflection of light which passing through the lens, and effectively reduces aberration. Preferably, the camera optical lens 10 further satisfies a condition of $0.62 \le (R5+R6)/(R5-R6) \le 1.96$.

An on-axis thickness of the third lens L3 is defined as d5, and the camera optical lens 10 further satisfies a condition of $0.08 \le d5/TTL \le 0.34$. This can facilitate achieving ultra-thin lenses. Preferably, the camera optical lens 10 further satisfies a condition of $0.12 \le d5/TTL \le 0.27$.

In an embodiment, an object-side surface of the fourth lens L4 is convex in the proximal region, and an image-side surface of the fourth lens L4 is concave in the proximal region.

A curvature radius of the object-side surface of the fourth lens L4 is defined as R7, a curvature radius of the image-side surface of the fourth lens L4 is defined as R8, and the camera optical lens 10 further satisfies a condition of $0.76 \le (R7+R8)/(R7-R8) \le 3.49$, which specifies a shape of the fourth lens L4. Within this range, a development towards ultra-thin and wide-angle lens would easily correcting a problem like an off-axis aberration. Preferably, the camera optical lens 10 further satisfies a condition of $1.21 \le (R7+R8)/(R7-R8) \le 2.79$.

An on-axis thickness of the fourth lens L4 is defined as d7, and the camera optical lens 10 further satisfies a condition of $0.02 \le d7/TTL \le 0.16$, which can facilitate achieving ultra-thin lenses. Preferably, the camera optical lens 10 further satisfies a condition of $0.03 \le d7/TTL \le 0.13$.

In an embodiment, an image height of the camera optical lens 10 is defined as IH, a total optical length from the object side surface of the first lens L1 to the image surface Si of the camera optical lens along an optical axis is defined as TTL, and the camera optical lens 10 further satisfies a condition of $TTL/IH \le 2.14$. Thus, the camera optical lens is ultra-thin.

In an embodiment, an F number of the camera optical lens 10 is less than or equal to 2.05. The camera optical lens 10 has a better imaging performance and large aperture.

In an embodiment, a combined focal length of the first lens L1 and of the second lens L2 is defined as f12, and the camera optical lens 10 further satisfies a condition of $0.61 \le f12/f \le 3.54$. This can eliminate the aberration and distortion of the camera optical lens and reduce a back focal length of the camera optical lens, thereby maintaining miniaturization of the camera optical lens. Preferably, the camera optical lens 10 further satisfies a condition of $0.98 \le f12/f \le 2.83$.

In an embodiment, the TTL of the camera optical lens 10 is less than or equal to 5.39 mm. Thus, the camera optical lens is ultra-thin. Preferably, the TTL of the camera optical lens 10 is less than or equal to 5.14 mm.

When the focal length of the camera optical lens 10, the focal length and curvature radius of each lens satisfy above conditions, the camera optical lens 10 has excellent optical performance, whist satisfying design requirement for large aperture, wide-angle and ultra-thin. According to characteristic thereof, the camera optical lens 10 is especially suitable for mobile cameral lens assembly and WEB camera, which is constitute of CCD, CMOS and other camera elements with high pixels.

In the following, examples will be used to describe the camera optical lens 10 of the present invention. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image surface of the camera optical lens along the optical axis) in mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present invention are shown in Table 1 and Table 2.

TABLE 1

|  | R | d |  | nd |  | vd |
|---|---|---|---|---|---|---|
| S1 | ∞ | d0= | −0.009 |  |  |  |
| R1 | 2.799 | d1= | 0.708 | nd1 | 1.5444 | v1 55.82 |
| R2 | −13.967 | d2= | 0.088 |  |  |  |
| R3 | 5.016 | d3= | 0.930 | nd2 | 1.6610 | v2 20.53 |
| R4 | 2.521 | d4= | 0.298 |  |  |  |
| R5 | −10.285 | d5= | 0.628 | nd3 | 1.5444 | v3 55.82 |
| R6 | −0.683 | d6= | 0.030 |  |  |  |
| R7 | 1.281 | d7= | 0.261 | nd4 | 1.5444 | v4 55.82 |
| R8 | 0.511 | d8= | 0.600 |  |  |  |
| R9 | ∞ | d9= | 0.210 | ndg | 1.5168 | vg 64.17 |
| R10 | ∞ | d10= | 0.413 |  |  |  |

In the table, meanings of various symbols will be described as follows.

R: curvature radius of an optical surface, a central curvature radius for a lens;
S1: aperture;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of an object-side surface of the optical filter GF;
R10: curvature radius of an image-side surface of the optical filter GF;
d: on-axis thickness of a lens or an on-axis distance between lens;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the optical filter GF;
d9: on-axis thickness of the optical filter GF;
d10: on-axis distance from the image-side surface of the optical filter GF to the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
vg: abbe number of the optical filter GF.

Table 2 shows aspherical surface data of the camera optical lens 10 in Embodiment 1 of the present invention.

TABLE 2

|  | Conic coefficient | Aspheric surface coefficients | | | |
|---|---|---|---|---|---|
|  | k | A4 | A6 | A8 | A10 |
| R1 | −8.1163E+00 | −1.9393E−01 | 5.0525E+00 | −7.6275E+01 | 6.6093E+02 |
| R2 | 1.6249E+02 | −5.6039E−01 | 8.0877E−01 | −2.0223E+00 | 5.8558E+00 |
| R3 | −4.6312E+00 | −5.2424E−01 | 1.4912E+00 | −9.3536E+00 | 4.4637E+01 |
| R4 | 1.3343E+00 | −2.1948E−01 | 9.5325E−01 | −3.3253E+00 | 7.6247E+00 |
| R5 | 6.9728E+01 | −4.8933E−01 | 2.5127E+00 | −8.1354E+00 | 1.8279E+01 |
| R6 | −1.3769E+00 | 7.0154E−01 | −2.8719E+00 | 8.8812E+00 | −1.9832E+01 |
| R7 | −5.3466E+00 | −4.3526E−02 | −2.0744E−01 | 2.2527E−01 | −1.1330E−01 |
| R8 | −2.9767E+00 | −1.0189E−01 | −5.0699E−02 | 1.1566E−01 | −9.4764E−02 |

|  | Aspheric surface coefficients | | | | |
|---|---|---|---|---|---|
|  | A12 | A14 | A16 | A18 | A20 |
| R1 | −3.5315E+03 | 1.1789E+04 | −2.3951E+04 | 2.7083E+04 | −1.3066E+04 |
| R2 | −1.4857E+01 | 3.5393E+01 | −6.5178E+01 | 7.0463E+01 | −3.1904E+01 |
| R3 | −1.3449E+02 | 2.5839E+02 | −3.0680E+02 | 2.0522E+02 | −5.9234E+01 |
| R4 | −1.1699E+01 | 1.1969E+01 | −7.8424E+00 | 2.9754E+00 | −4.9685E−01 |
| R5 | −2.8250E+01 | 2.9096E+01 | −1.8896E+01 | 6.9820E+00 | −1.1191E+00 |
| R6 | 2.9906E+01 | −2.9284E+01 | 1.7683E+01 | −5.9141E+00 | 8.3048E−01 |
| R7 | 3.2107E−02 | −4.6926E−03 | 1.5878E−04 | 4.0334E−05 | −3.7204E−06 |
| R8 | 4.6070E−02 | −1.4159E−02 | 2.6722E−03 | −2.8006E−04 | 1.2386E−05 |

Here, K is a conic coefficient, and A4, A6, A8, A10, A12, A14, A16, A18 and A20 are aspheric surface coefficients.

IH: Image height $$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (7)$$

For convenience, an aspheric surface of each lens surface uses the aspheric surfaces shown in the above formula (7). However, the present invention is not limited to the aspherical polynomials form shown in the formula (7).

Table 3 and Table 4 show design data of inflexion points and arrest points of the camera optical lens 10 according to Embodiment 1 of the present invention. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 0.525 | | |
| P1R2 | 0 | | | |
| P2R1 | 3 | 0.205 | 0.725 | 0.835 |
| P2R2 | 0 | | | |
| P3R1 | 2 | 0.805 | 1.105 | |
| P3R2 | 1 | 0.935 | | |
| P4R1 | 3 | 0.505 | 1.365 | 1.925 |
| P4R2 | 1 | 0.535 | | |

TABLE 4

| | Number(s) of arrest points | Arrest point position 1 | Arrest point position 2 |
|---|---|---|---|
| P1R1 | 0 | | |
| P1R2 | 0 | | |
| P2R1 | 1 | 0.355 | |
| P2R2 | 0 | | |
| P3R1 | 1 | 1.025 | |
| P3R2 | 0 | | |
| P4R1 | 2 | 0.975 | 1.715 |
| P4R2 | 1 | 1.425 | |

Figure 2:
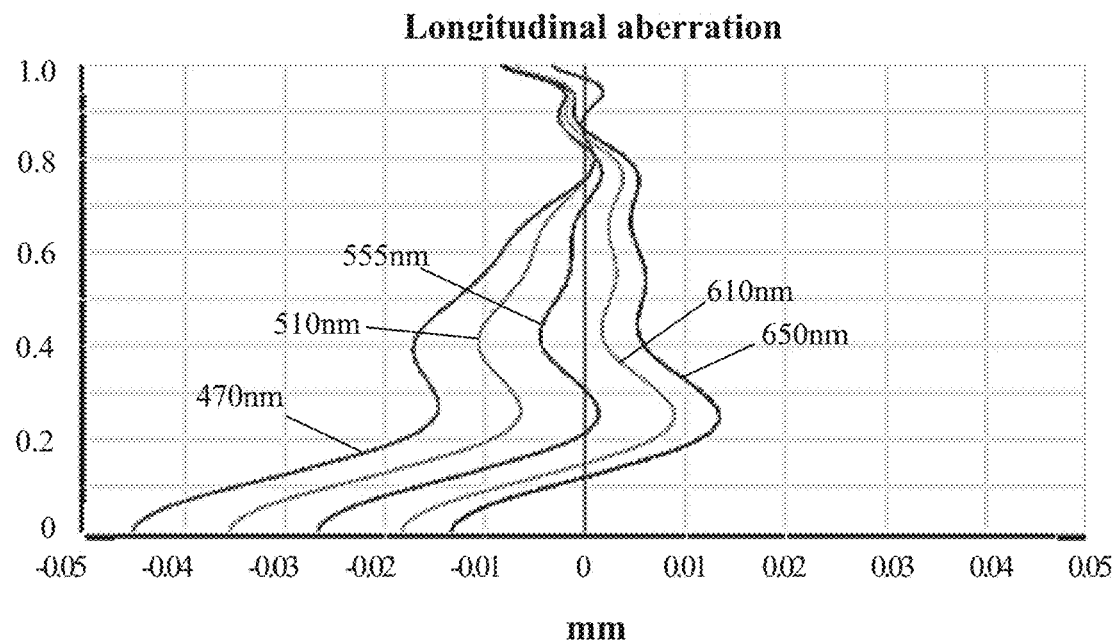
FIG. 2 is a schematic diagram of a longitudinal aberration of the camera optical lens shown in FIG. 1.
Figure 3:
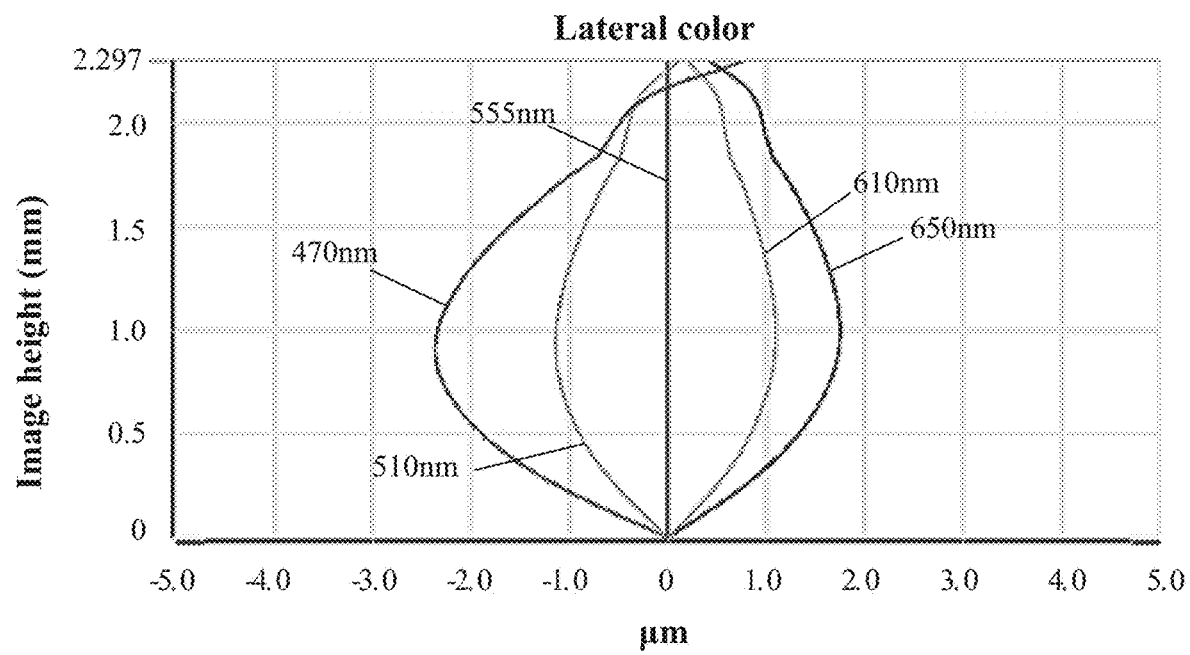
FIG. 3 is a schematic diagram of a lateral color of the camera optical lens shown in FIG. 1.
Figure 4:
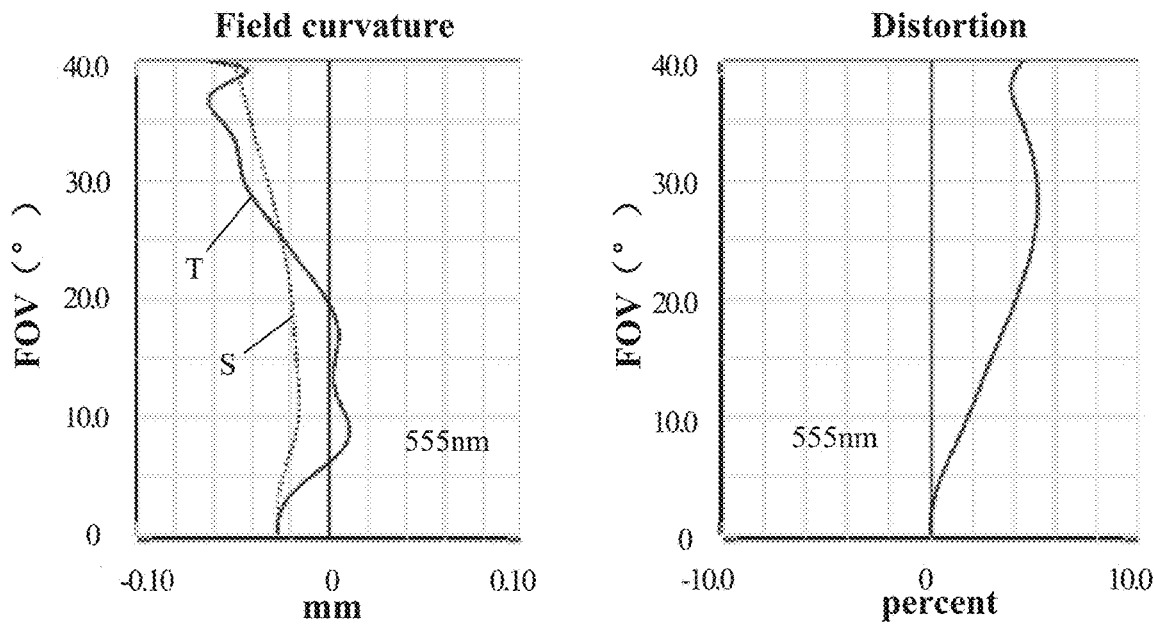
FIG. 4 is a schematic diagram of a field curvature and a distortion of the camera optical lens shown in FIG. 1.

FIG. 2 and FIG. 3 illustrate a longitudinal aberration and a lateral color with wavelengths of 470 nm, 510 nm, 555 nm, 610 nm and 650 nm after passing the camera optical lens 10 according to Embodiment 1, respectively. FIG. 4 illustrates a field curvature and a distortion with a wavelength of 555 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, 3 and values corresponding to parameters which are specified in the above conditions.

As shown in Table 13, Embodiment 1 satisfies the above conditions.

In this Embodiment, an entrance pupil diameter of the camera optical lens is 1.252 mm, an image height of 1.0 H is 2.297 mm, a FOV (field of view) in a diagonal direction is 80.00°. Thus, the camera optical lens has a large aperture, wide-angle and is ultra-thin. Its on-axis and off-axis chromatic aberrations are fully corrected, thereby achieving excellent optical characteristics.

Embodiment 2

Figure 5:
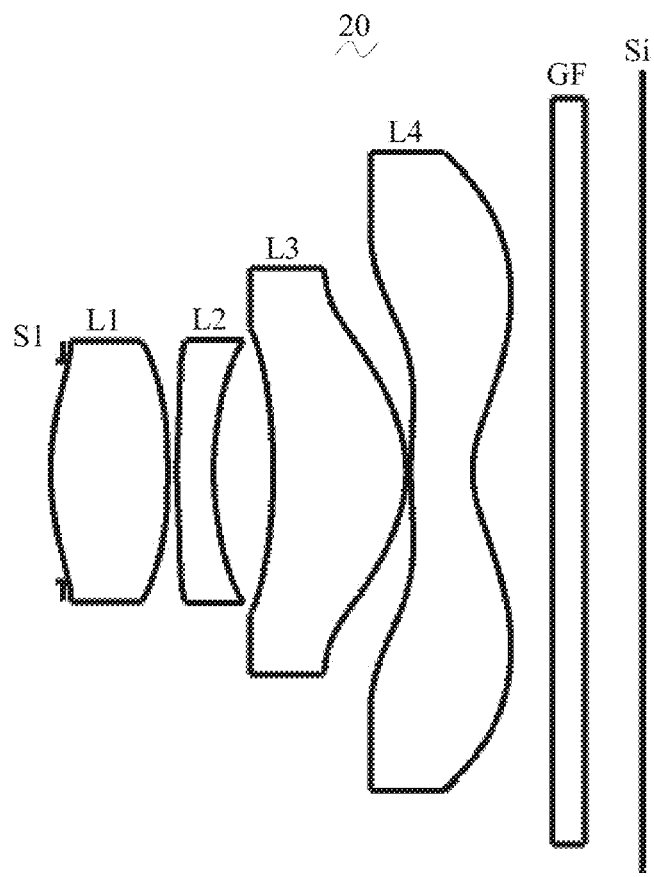
FIG. 5 is a schematic diagram of a structure of a camera optical lens according to Embodiment 2 of the present invention.

FIG. 5 is a schematic diagram of a structure of a camera optical lens according to Embodiment 2 of the present invention. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present invention.

TABLE 5

| | R | d | | nd | | vd | |
|---|---|---|---|---|---|---|---|
| S1 | ∞ | d0= | −0.073 | | | | |
| R1 | 1.741 | d1= | 0.734 | nd1 | 1.5444 | v 1 | 55.82 |
| R2 | −6.506 | d2= | 0.061 | | | | |
| R3 | 2.798 | d3= | 0.230 | nd2 | 1.6610 | v 2 | 20.53 |
| R4 | 1.718 | d4= | 0.375 | | | | |
| R5 | −3.345 | d5= | 0.838 | nd3 | 1.5444 | v 3 | 55.82 |
| R6 | −0.805 | d6= | 0.030 | | | | |
| R7 | 2.436 | d7= | 0.389 | nd4 | 1.5444 | v 4 | 55.82 |
| R8 | 0.620 | d8= | 0.500 | | | | |
| R9 | ∞ | d9= | 0.210 | ndg | 1.5168 | v g | 64.17 |
| R10 | ∞ | d10= | 0.366 | | | | |

Table 6 shows aspherical surface data of each lens of the camera optical lens 20 in Embodiment 2 of the present invention.

TABLE 6

| | Conic coefficient | Aspheric surface coefficients | | | |
|---|---|---|---|---|---|
| | k | A4 | A6 | A8 | A10 |
| R1 | −6.0124E+00 | 2.0607E−02 | 4.3988E−01 | −3.2414E+00 | 9.8585E+00 |
| R2 | −7.1045E+01 | −6.0477E−01 | 1.1738E−01 | 6.7296E+00 | −2.8535E+01 |
| R3 | −2.1365E+01 | −4.9514E−01 | −5.1039E−01 | 1.1285E+01 | −4.2866E+01 |
| R4 | 1.4880E+00 | −2.8751E−01 | 4.4608E−01 | −1.3484E+00 | 7.0813E+00 |
| R5 | 1.2338E+01 | 1.5757E−01 | −4.5770E−01 | 2.0827E−01 | 1.7853E+00 |
| R6 | −1.7097E+00 | 3.4096E−01 | −1.1014E+00 | 1.9630E+00 | −2.4043E+00 |
| R7 | −5.4937E+01 | −3.6557E−01 | 7.2889E−02 | 1.3384E−01 | −7.6724E−02 |
| R8 | −4.6732E+00 | −2.7101E−01 | 2.2552E−01 | −1.4262E−01 | 6.0008E−02 |

TABLE 6-continued

| | Aspheric surface coefficients | | | | |
|---|---|---|---|---|---|
| | A12 | A14 | A16 | A18 | A20 |
| R1 | −1.7087E+01 | 1.4755E+01 | −4.5875E+00 | 0.0000E+00 | 0.0000E+00 |
| R2 | 5.5074E+01 | −5.2550E+01 | 1.9884E+01 | 0.0000E+00 | 0.0000E+00 |
| R3 | 8.2485E+01 | −8.1396E+01 | 3.2663E+01 | 0.0000E+00 | 0.0000E+00 |
| R4 | −1.8777E+01 | 2.3354E+01 | −1.0920E+01 | 0.0000E+00 | 0.0000E+00 |
| R5 | −4.0681E+00 | 3.7094E+00 | −1.2370E+00 | 0.0000E+00 | 0.0000E+00 |
| R6 | 2.0005E+00 | −9.0318E−01 | 1.6032E−01 | 0.0000E+00 | 0.0000E+00 |
| R7 | 1.1106E−02 | 1.3257E−03 | −3.5300E−04 | 0.0000E+00 | 0.0000E+00 |
| R8 | −1.5844E−02 | 2.3289E−03 | −1.4333E−04 | 0.0000E+00 | 0.0000E+00 |

Table 7 and table 8 show design data of inflexion points and arrest points of each lens of the camera optical lens 20 lens according to Embodiment 2 of the present invention.

TABLE 7

| | Number(s) of inflexion points | Inflexion point position 1 | Inflexion point position 2 | Inflexion point position 3 |
|---|---|---|---|---|
| P1R1 | 1 | 0.575 | | |
| P1R2 | 0 | | | |
| P2R1 | 2 | 0.235 | 0.495 | |
| P2R2 | 0 | | | |
| P3R1 | 0 | | | |
| P3R2 | 2 | 0.835 | 1.175 | |
| P4R1 | 3 | 0.235 | 1.005 | 1.635 |
| P4R2 | 1 | 0.415 | | |

TABLE 8

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 0 | | |
| P3R2 | 0 | | |
| P4R1 | 2 | 0.435 | 1.525 |
| P4R2 | 1 | 1.085 | |

Figure 6:
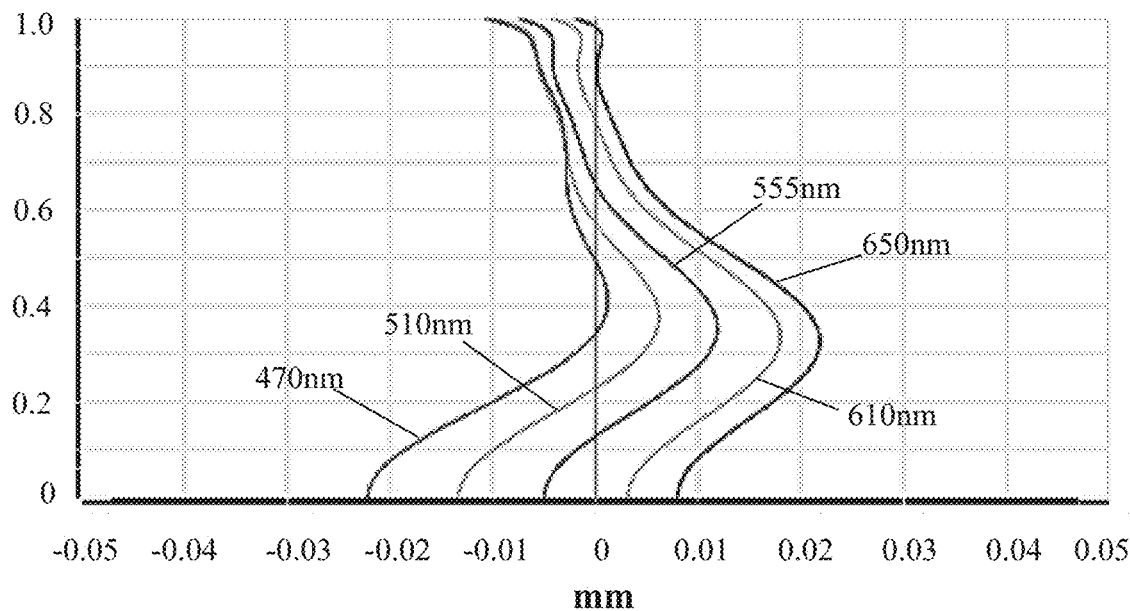
FIG. 6 is a schematic diagram of a longitudinal aberration of the camera optical lens shown in FIG. 5.
Figure 7:
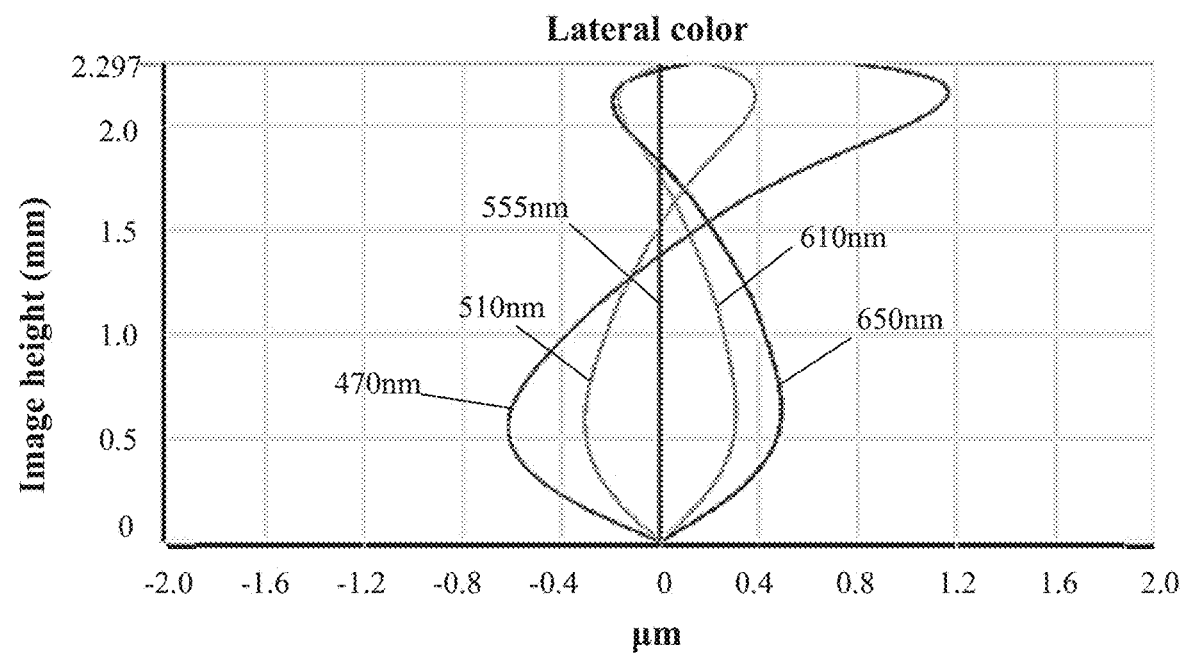
FIG. 7 is a schematic diagram of a lateral color of the camera optical lens shown in FIG. 5.
Figure 8:
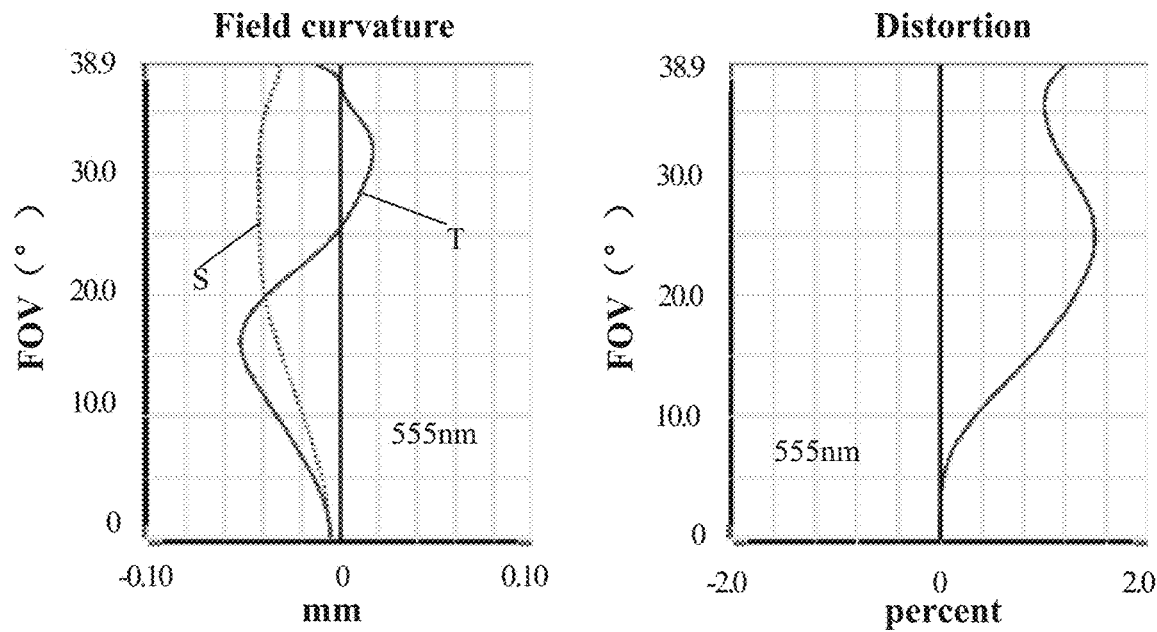
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

Table 13 in the following shows various values of Embodiments 1, 2, 3 and values corresponding to parameters which are specified in the above conditions.

As shown in Table 13, Embodiment 2 satisfies the above conditions.

In an embodiment, an entrance pupil diameter of the camera optical lens is 1.359 mm, an image height of 1.0 H is 2.297 mm, a FOV (field of view) in the diagonal direction is 77.80°. Thus, the camera optical lens has a large aperture, wide-angle and is ultra-thin, thereby achieving excellent optical characteristics.

Embodiment 3

Figure 9:
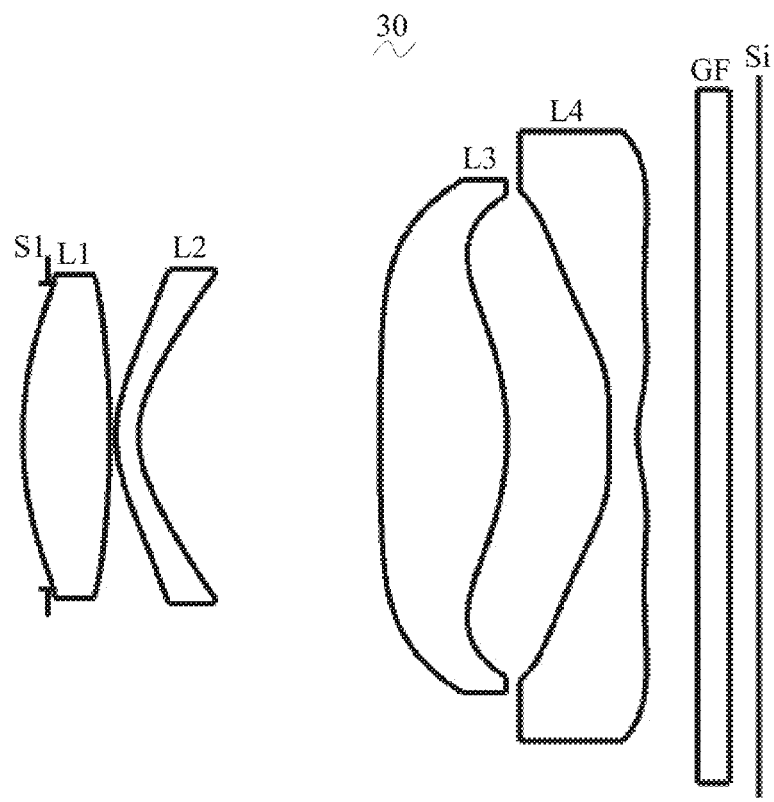
FIG. 9 is a schematic diagram of a structure of a camera optical lens according to Embodiment 3 of the present invention.

FIG. 9 is a schematic diagram of a structure of a camera optical lens according to Embodiment 3 of the present invention. Embodiment 3 is basically the same as Embodiment 1 and involves symbols having the same meanings as Embodiment 1, and only differences therebetween will be described in the following.

In an embodiment, the object-side surface of the third lens L3 is convex in the proximal region.

Table 9 and Table 10 show design data of a camera optical lens 30 in Embodiment 3 of the present invention.

TABLE 9

| | R | d | | nd | | vd | |
|---|---|---|---|---|---|---|---|
| S1 | ∞ | d0= | −0.168 | | | | |
| R1 | 2.536 | d1= | 0.580 | nd1 | 1.5444 | v 1 | 55.82 |
| R2 | −6.391 | d2= | 0.040 | | | | |
| R3 | 0.875 | d3= | 0.150 | nd2 | 1.6610 | v 2 | 20.53 |
| R4 | 0.679 | d4= | 1.604 | | | | |
| R5 | 15.312 | d5= | 0.849 | nd3 | 1.5444 | v 3 | 55.82 |
| R6 | −1.901 | d6= | 0.675 | | | | |
| R7 | 3.854 | d7= | 0.192 | nd4 | 1.5444 | v 4 | 55.82 |
| R8 | 0.786 | d8= | 0.400 | | | | |
| R9 | ∞ | d9= | 0.210 | ndg | 1.5168 | v g | 64.17 |
| R10 | ∞ | d10= | 0.199 | | | | |

Table 10 shows aspherical surface data of each lens of the camera optical lens 30 in Embodiment 3 of the present invention.

TABLE 10

| | Conic coefficient | Aspherical surface coefficients | | | |
|---|---|---|---|---|---|
| | k | A4 | A6 | A8 | A10 |
| R1 | −7.0099E−01 | 8.6077E−03 | 2.2090E−01 | −1.5818E+00 | 5.3471E+00 |
| R2 | −1.2697E+02 | −2.0122E−01 | 1.2744E+00 | −4.9541E+00 | 1.2213E+01 |
| R3 | −4.7467E+00 | −1.7470E−02 | 1.3809E−01 | −1.3160E+00 | 4.7019E+00 |
| R4 | −6.7733E−01 | −8.3236E−01 | 9.9838E−01 | −1.7730E+00 | 3.6538E+00 |
| R5 | −6.3716E+01 | 1.0624E−02 | −6.3764E−02 | 1.7607E−01 | −1.9358E−01 |
| R6 | −1.8111E+00 | −1.7800E−02 | 1.1817E−02 | 6.8240E−02 | −5.9483E−02 |

TABLE 10-continued

| | | | | |
|---|---|---|---|---|
| R7 | −2.0000E+02 | −1.8256E+00 | 4.1905E+00 | −5.4876E+00 | 4.6964E+00 |
| R8 | −1.1475E+01 | −9.4525E−01 | 1.6871E+00 | −1.6114E+00 | 9.6879E−01 |

Aspherical surface coefficients

| | A12 | A14 | A16 | A18 | A20 |
|---|---|---|---|---|---|
| R1 | −1.0739E+01 | 1.3303E+01 | −9.9841E+00 | 4.1592E+00 | −7.3794E−01 |
| R2 | −1.9631E+01 | 2.0398E+01 | −1.3202E+01 | 4.8346E+00 | −7.6481E−01 |
| R3 | −9.2183E+00 | 1.0724E+01 | −7.3918E+00 | 2.8015E+00 | −4.5130E−01 |
| R4 | −7.1511E+00 | 9.6149E+00 | −7.9151E+00 | 3.5984E+00 | −6.9799E−01 |
| R5 | 1.3250E−01 | −5.8707E−02 | 1.6208E−02 | −2.5180E−03 | 1.6778E−04 |
| R6 | 1.5707E−02 | 1.0981E−02 | −9.8405E−03 | 2.8406E−03 | −2.9036E−04 |
| R7 | −2.7074E+00 | 1.0421E+00 | −2.5676E−01 | 3.6629E−02 | −2.3043E−03 |
| R8 | −3.8306E−01 | 9.9405E−02 | −1.6290E−02 | 1.5275E−03 | −6.2399E−05 |

Table 11 and Table 12 show design data inflexion points and arrest points of the respective lenses in the camera optical lens 30 according to Embodiment 3 of the present invention.

TABLE 11

| | Number(s) of inflexion points | Inflexion point position 1 | Inflexion point position 2 | Inflexion point position 3 |
|---|---|---|---|---|
| P1R1 | 1 | 0.925 | | |
| P1R2 | 0 | | | |
| P2R1 | 2 | 0.685 | 0.965 | |
| P2R2 | 0 | | | |
| P3R1 | 0 | | | |
| P3R2 | 1 | 0.815 | | |
| P4R1 | 3 | 0.105 | 0.765 | 1.185 |
| P4R2 | 3 | 0.235 | 0.755 | 1.305 |

TABLE 12

| | Number of arrest points | Arrest point position 1 | Arrest point position 2 | Arrest point position 3 |
|---|---|---|---|---|
| P1R1 | 0 | | | |
| P1R2 | 0 | | | |
| P2R1 | 0 | | | |
| P2R2 | 0 | | | |
| P3R1 | 0 | | | |
| P3R2 | 1 | 1.215 | | |
| P4R1 | 1 | 0.185 | | |
| P4R2 | 3 | 0.555 | 1.005 | 1.535 |

Figure 10:
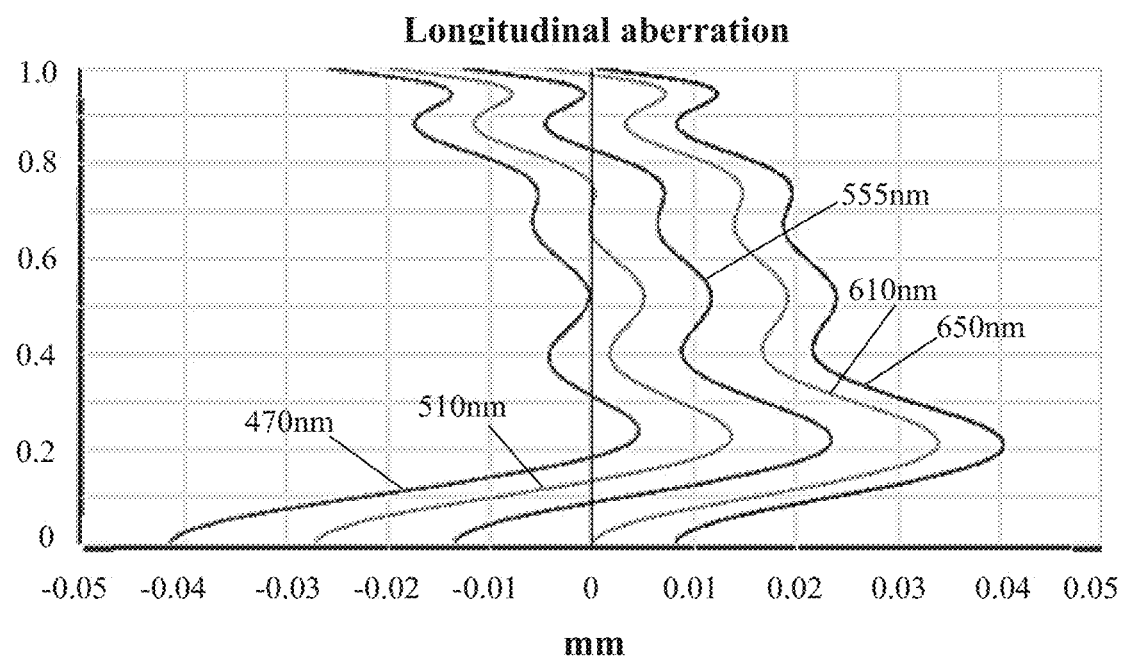
FIG. 10 is a schematic diagram of a longitudinal aberration of the camera optical lens shown in FIG. 9.
Figure 11:
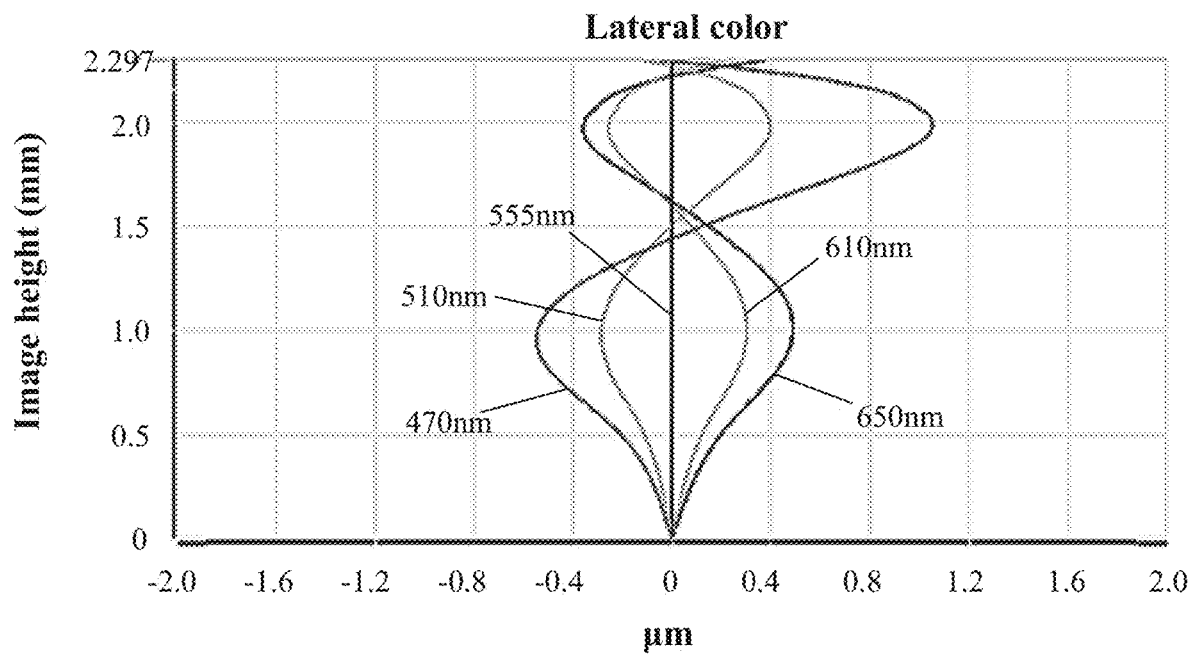
FIG. 11 is a schematic diagram of a lateral color of the camera optical lens shown in FIG. 9.
Figure 12:
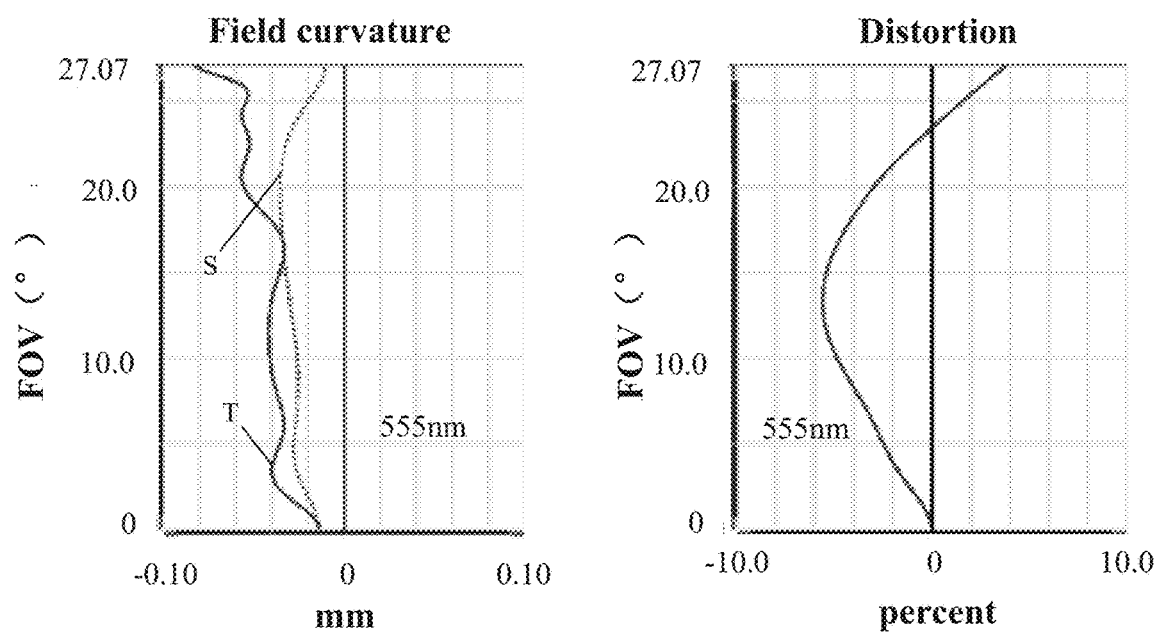
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470 nm, 510 nm, 555 nm, 610 nm and 650 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

Table 13 in the following lists values corresponding to the respective conditions in an embodiment according to the above conditions. Obviously, the embodiment satisfies the above conditions.

In an embodiment, an entrance pupil diameter of the camera optical lens is 2.051 mm, an image height of 1.0 H is 2.297 mm, a FOV (field of view) in the diagonal direction is 54.14°. Thus, the camera optical lens has a large aperture, wide-angle and is ultra-thin. Its on-axis and off-axis chromatic aberrations are fully corrected, thereby achieving excellent optical characteristics.

Table 13 in the following lists values corresponding to the respective conditions in an embodiment according to the above conditions.

TABLE 13

| Parameters and conditions | Embodiment 1 | Embodiment 2 | Embodiment 3 |
|---|---|---|---|
| f2/f | −3.48 | −2.62 | −1.55 |
| (R3 + R4)/(R3 − R4) | 3.02 | 4.18 | 7.93 |
| d1/d2 | 8.05 | 12.03 | 14.50 |
| f3/f | 0.51 | 0.62 | 0.75 |
| R2/R1 | −4.99 | −3.74 | −2.52 |
| f4/f | −0.69 | −0.59 | −0.44 |
| F | 2.566 | 2.785 | 4.205 |
| f1 | 4.334 | 2.597 | 3.402 |
| f2 | −8.930 | −7.292 | −6.518 |
| f3 | 1.309 | 1.737 | 3.151 |
| f4 | −1.771 | −1.649 | −1.850 |
| f12 | 6.057 | 3.422 | 5.534 |
| Fno | 2.05 | 2.05 | 2.05 |

Fno: an F number of the camera optical lens.

It can be appreciated by one having ordinary skill in the art that the description above is only embodiments of the present invention. In practice, one having ordinary skill in the art can make various modifications to these embodiments in forms and details without departing from the scope of the present invention.

What is claimed is:

1. A camera optical lens comprising, from an object side to an image side:
   a first lens having a positive refractive power;
   a second lens having a negative refractive power;
   a third lens having a positive refractive power; and
   a fourth lens having a negative refractive power;
   wherein the camera optical lens satisfies following conditions:

$-3.50 \leq f2/f \leq -1.50$;

$3.00 \leq (R3+R4)/(R3-R4) \leq 8.00$;

$8.00 \leq d1/d2 \leq 15.00$;

$0.50 \leq f3/f \leq 0.75$;

$-5.00 \leq R2/R1 \leq -2.50$; and $-0.70 \leq f4/f \leq -0.40$;

where
   f denotes a focal length of the camera optical lens;
   f2 denotes a focal length of the second lens;
   f3 denotes a focal length of the third lens;

f4 denotes a focal length of the fourth lens;

R1 denotes a curvature radius of the object-side surface of the first lens;

R2 denotes a curvature radius of the image-side surface of the first lens;

R3 denotes a curvature radius of the object-side surface of the second lens;

R4 denotes a curvature radius of the image-side surface of the second lens;

d1 denotes an on-axis thickness of the first lens; and d2 denotes an on-axis distance from the image-side surface of the first lens to the object-side surface of the second lens.

2. The camera optical lens according to claim 1 further satisfying following conditions:

$$2.50 \leq R7/R8 \leq 5.00;$$

where

R7 denotes a curvature radius of the object-side surface of the fourth lens; and R8 denotes a curvature radius of the image-side surface of the fourth lens.

3. The camera optical lens according to claim 1, further satisfying following conditions:

$$0.40 \leq f1/f \leq 2.53;$$

$$-1.33 \leq (R1+R2)/(R1-R2) \leq -0.29;\text{ and}$$

$$0.06 \leq d1/TTL \leq 0.29;$$

where f1 denotes a focal length of the first lens; and

TTL denotes a total optical length from the object-side surface of the first lens to an image surface of the camera optical lens along an optical axis.

4. The camera optical lens according to claim 1 further satisfying following conditions:

$$0.02 \leq d3/TTL \leq 0.33;$$

where d3 denotes an on-axis thickness of the second lens; and

TTL denotes a total optical length from the object-side surface of the first lens to an image surface of the camera optical lens along an optical axis.

5. The camera optical lens according to claim 1 further satisfies following conditions:

$$0.39 \leq (R5+R6)/(R5-R6) \leq 2.45;\text{ and}$$

$$0.08 \leq d5/TTL \leq 0.34;$$

where

R5 denotes a curvature radius of the object-side surface of the third lens;

R6 denotes a curvature radius of the image-side surface of the third lens;

d5 denotes an on-axis thickness of the third lens; and

TTL denotes a total optical length from the object-side surface of the first lens to an image surface of the camera optical lens along an optical axis.

6. The camera optical lens according to claim 1 further satisfies following conditions:

$$0.76 \leq (R7+R8)/(R7-R8) \leq 3.49;\text{ and}$$

$$0.02 \leq d7/TTL \leq 0.16;$$

where

R7 denotes a curvature radius of the object-side surface of the fourth lens;

R8 denotes a curvature radius of the image-side surface of the fourth lens;

d7 denotes an on-axis thickness of the fourth lens; and

TTL denotes a total optical length from the object-side surface of the first lens to an image surface of the camera optical lens along an optical axis.

7. The camera optical lens according to claim 1 further satisfies following conditions:

$$TTL/IH \leq 2.14;$$

where

IH denotes an image height of the camera optical lens; and

TTL denotes a total optical length from the object-side surface of the first lens to an image surface of the camera optical lens along an optical axis.

8. The camera optical lens according to claim 1 further satisfies following conditions:

$$FNO \leq 2.05;$$

where

FNO denotes an F number of the camera optical lens.

9. The camera optical lens according to claim 1 further satisfies following conditions:

$$0.61 \leq f12/f \leq 3.54;$$

where f12 denotes a combined focal length of the first lens and of the second lens.

10. The camera optical lens according to claim 1 further satisfies following conditions:

$$TTL \leq 5.39;$$

where TTL denotes a total optical length from the object-side surface of the first lens to an image surface of the camera optical lens along an optical axis.

* * * * *